United States Patent
Zou et al.

(10) Patent No.: US 11,798,041 B2
(45) Date of Patent: *Oct. 24, 2023

(54) AD COLLISION REDUCTION

(71) Applicant: Zeta Global Corp., New York, NY (US)

(72) Inventors: Chendong Zou, Palo Alto, CA (US); Yogesh Kumar, Belmont, CA (US); Guodong Han, Sunnyvale, CA (US)

(73) Assignee: Zeta Global Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,922

(22) Filed: Dec. 20, 2021

(65) Prior Publication Data
US 2022/0114619 A1 Apr. 14, 2022

Related U.S. Application Data

(63) Continuation of application No. 16/984,081, filed on Aug. 3, 2020, now Pat. No. 11,244,360, which is a continuation of application No. 15/385,697, filed on Dec. 20, 2016, now Pat. No. 10,789,623.

(60) Provisional application No. 62/399,261, filed on Sep. 23, 2016.

(51) Int. Cl.
*G06Q 30/0273* (2023.01)
*G06F 7/02* (2006.01)

(52) U.S. Cl.
CPC ........... *G06Q 30/0275* (2013.01); *G06F 7/02* (2013.01)

(58) Field of Classification Search
CPC .............................. G06Q 30/0275; G06F 7/02
See application file for complete search history.

(56) References Cited

U.S. PATENT DOCUMENTS

| | | | |
|---|---|---|---|
| 7,647,331 B2 | 1/2010 | Li et al. | |
| 10,789,623 B1 | 9/2020 | Zou et al. | |
| 10,984,455 B1* | 4/2021 | Ayars | G06Q 30/0276 |
| 2009/0052784 A1 | 2/2009 | Covell et al. | |
| 2009/0265243 A1* | 10/2009 | Karassner | G06Q 30/0275 |
| | | | 705/14.54 |
| 2012/0063460 A1 | 3/2012 | Hallivuori | |

(Continued)

OTHER PUBLICATIONS

"U.S. Appl. No. 15/385,697, Advisory Action dated Apr. 24, 2020", 4 pgs.

(Continued)

*Primary Examiner* — Alexandru Cirnu
(74) *Attorney, Agent, or Firm* — Schwegman Lundberg & Woessner, P.A.

(57) ABSTRACT

An ad collision machine can be configured to evaluate collision queries for possible ad collisions and is associated with an ad datacenter configured to evaluate and respond to bid requests on behalf of a plurality of advertisers. The ad collision machine can comprise a plurality of nodes and a data cache containing a plurality of user ID—campaign ID keys representing recently submitted bids in response to bid requests. Once a selected node receives a collision query, a user ID—campaign ID key is retrieved from the collision query. If the first key is not found in the data cache, it is written to the data cache by the node and the ad collision machine returns that user ID—campaign ID pair as available to be bid on.

20 Claims, 9 Drawing Sheets

(56) References Cited

U.S. PATENT DOCUMENTS

2015/0248698 A1     9/2015   Bhattacharjee et al.
2020/0364754 A1    11/2020   Zou et al.

OTHER PUBLICATIONS

"U.S. Appl. No. 15/385,697, Final Office Action dated Feb. 18, 2020", 8 pgs.
"U.S. Appl. No. 15/385,697, Non Final Office Action dated Jul. 15, 2019", 9 pgs.
"U.S. Appl. No. 15/385,697, Non Final Office Action dated Dec. 9, 2019", 14 pgs.
"U.S. Appl. No. 15/385,697, Notice of Allowability dated Jul. 10, 2020", 2 pgs.
"U.S. Appl. No. 15/385,697, Notice of Allowance dated Jun. 17, 2020", 5 pgs.
"U.S. Appl. No. 15/385,697, Response filed Jan. 31, 2020 to Non Final Office Action dated Dec. 9, 2019", 10 pgs.
"U.S. Appl. No. 15/385,697, Response filed Apr. 20, 2020 to Final Office Action dated Feb. 18, 2020", 13 pgs.
"U.S. Appl. No. 15/385,697, Response filed Oct. 11, 2019 to Non-Final Office Action dated Jul. 15, 2019", 13 pgs.
"U.S. Appl. No. 16/984,081, Non Final Office Action dated Jun. 11, 2021", 7 pgs.
"U.S. Appl. No. 16/984,081, Notice of Allowance dated Oct. 22, 2021", 10 pgs.
"U.S. Appl. No. 16/984,081, Response filed Oct. 7, 2021 to Non Final Office Action dated Jun. 11, 2021", 9 pgs.
Seidel, Craig, "Content Fingerprinting From An Industry Perspective", Motion Picture Laboratories, Inc. (MovieLabs), (2009).

\* cited by examiner

AD COLLISION REDUCTION

CROSS REFERENCE TO RELATED APPLICATIONS

This application is a continuation of U.S. patent application Ser. No. 16/984,081 filed on Aug. 3, 2020, which application is a continuation of U.S. patent application Ser. No. 15/385,697 filed on Dec. 20, 2016, which claims priority under 35 U.S.C. § 119(e) to U.S. Provisional Application Ser. No. 62/399,261, filed on Sep. 23, 2016, which are incorporated herein by reference in their entirety.

TECHNICAL FIELD

This description generally relates to preventing ad collisions among advertisements presented to internet users.

BACKGROUND

Advertising is ubiquitous across the internet. Web pages or other content delivery medium often include space for multiple ads to be presented in (hereinafter, ad spaces) alongside the content of the web page. Advertisements (ads) can be presented for example, with the hope of inducing the viewer to perform some desired act including such as visiting a specific web page, signing up for an electronic newsletter at a specific web page, or making a purchase of a specific product or from a specific online store. To fill ad spaces, content publishers (or publisher brokers associated with one or more content publishers) submit bid requests inviting advertisers to bid on the ad spaces in a real-time market for individual impressions of a web page for individual viewing users of the web page. Many advertisers submit information about ad campaigns to one or more advertisement (ad) datacenters where the bid requests are evaluated and responded to on behalf of the advertisers. In order to efficiently respond to many bid requests at once, many ad datacenters contain multiple servers which can independently evaluate and respond to bid requests.

However, the structure of the bid request system and the ad datacenters creates the problem of ad collisions between ad spaces on the same web page (or content delivery medium). An ad collision can occur when multiple ads for the same advertising campaign appear in different ad spaces simultaneously visible on a same web page. Ad collisions result in less impact per advertisement because of the inefficiency caused from the viewing user seeing multiple of the same/similar advertisements for the same ad campaign simultaneously. For example, an ad collision can occur when bid requests corresponding to several ad spaces on the same web page are evaluated by different machines within an ad datacenter. Because the machines within the ad datacenter operate independently to some extent, each machine can independently bid on the ad space for the same campaign, and if any of the bids for that campaign are accepted, it is also likely that other bids for different ad spaces on the page will be accepted. Therefore, there is need for a system to reduce the rate of ad collisions occurring in online advertising systems.

SUMMARY

An ad collision machine receives a collision query comprising a user ID and one or more campaign IDs. An ad collision machine can be configured to evaluate collision quelies for possible ad collisions and is associated with an ad datacenter configured to evaluate and respond to bid requests on behalf of a plurality of advertisers. The ad collision machine can comprise a plurality of nodes and a data cache containing a plurality of user ID—campaign ID keys representing recently submitted bids in response to bid requests. The received user ID is hashed and a node of the plurality of nodes of the ad collision machine is selected based on the hashed user ID. The ad collision machine then assigns the received collision query to the selected node for evaluation.

Once the selected node receives the collision query, a first key is retrieved from the collision query. The first key can be a user ID—campaign ID pair containing the received user ID an one of the campaign IDs from the one or more campaign IDs from the collision query. The node then compares the first key to the keys stored in the data cache of the ad collision machine. If the first key is not found in the data cache, it is written to the data cache by the node and the ad collision machine returns that user ID—campaign ID pair as available to be bid on.

DETAILED DESCRIPTION

I. Network Environment for Ad Collision Management

Figure 1:
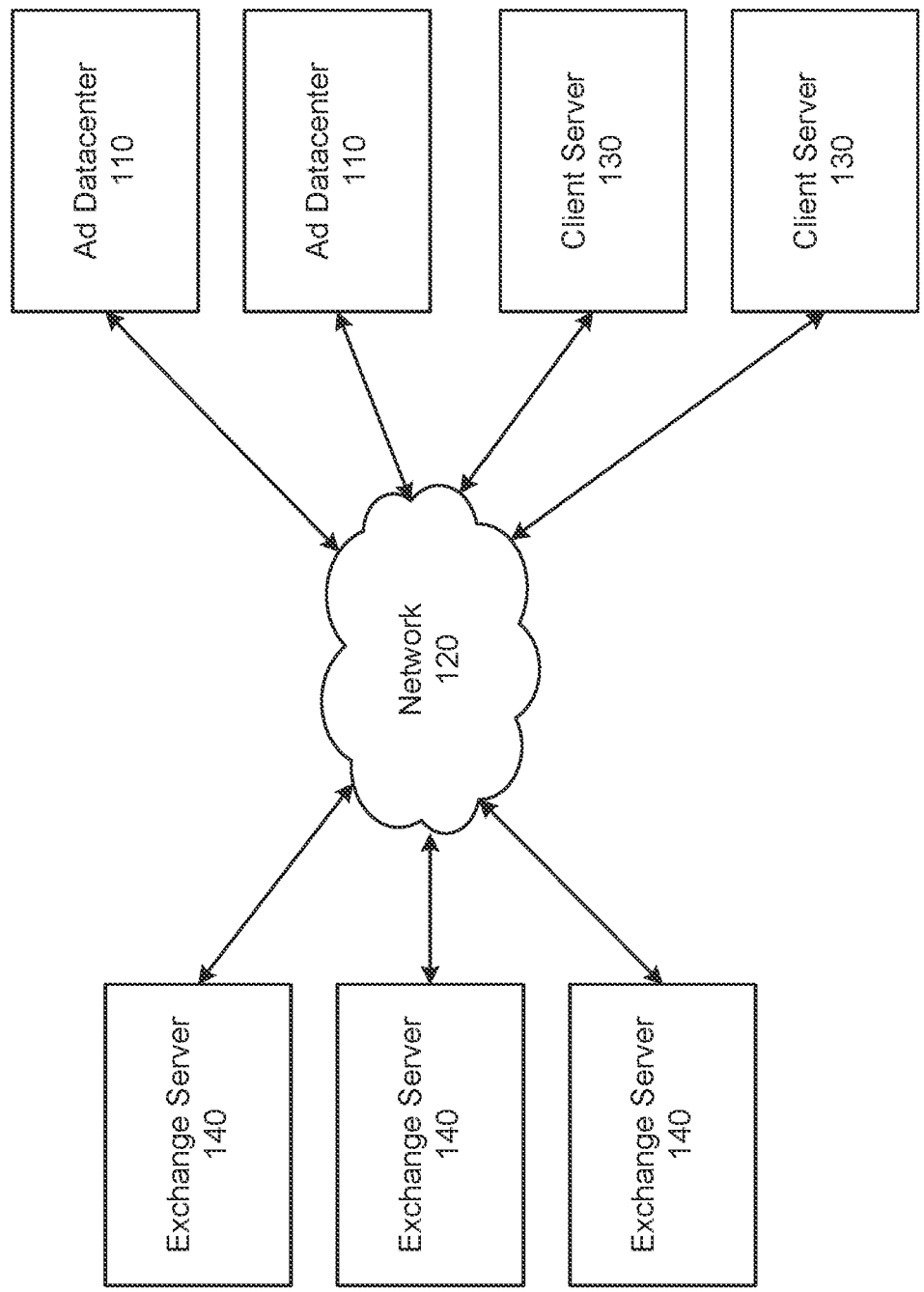
FIG. 1 is a block diagram illustrating an example networking environment in which an ad datacenter operates, according to one embodiment.

FIG. 1 is a block diagram illustrating an example computer network environment in which an ad datacenter operates, according to one embodiment. The environment of FIG. 1 includes ad datacenters 110, client servers 130, and outside servers 140, communicatively connected through the network 120. Although FIG. 1 shows specific numbers of advertisement data centers 110, client servers 130, and outside servers 140, practically the numbers of each type of entity connected to the network 120 can vary and can be more or less than the numbers depicted in FIG. 1.

In the embodiments of the present invention described below, users operate user devices (not shown) communicating over a network to request webpages and other media content data from web servers. For example, a user device can be a phone, tablet, laptop, or other suitable computing device. Each user device can be configured to execute a software application, such as a web browser, to access webpages, media content and/or other data managed by a physically remote computer server, such as a web page server. For convenience throughout, a webpage/web server context is described, however the description is equally applicable to other contexts, such as, more generally, a software application running on a computing device such as a mobile computing device. The webpages that are displayed to a user are transmitted from the web server to the user's user device and processed by the web browser application of the user device for display through a monitor of the user's user device.

Webpages may contain an instruction, often referred to as an "ad tag," to request advertising content to be displayed on the webpage. In response to processing a webpage having an ad tag, the web browser application can request advertising content from a web publisher. The publisher sells the advertising space to advertisers either directly or via an ad exchange 140. When the publisher offers up for sale the advertising space for the webpage, various advertisers and/or ad datacenters 110 bid to purchase the advertising space. Once an ad server or ad datacenter 110 has purchased a particular advertising space, the publisher then presents an impression of the ad by providing the winning ad server or datacenter 110 the ability to present the ad to the user via the webpage. The web browser application of the user device can receive the advertising content and display the advertising to the user through the display of the user's device. In one embodiment, the web browser application displays the advertising inline and/or integrated with the requested webpage content. In real time bidding systems, bid requests are time sensitive, such that a bid request must be responded to promptly (e.g., on the order of 100 milliseconds) as the web page cannot fully load until the ad space is filled. As such, such real time systems online offer potential bidders a small window in which to make a bid, in order to avoid a delay to the user in loading the webpage.

An ad datacenter 110 is a computing device or a collection of computing devices programmed to bid on ad spaces in response to received bid requests. An ad datacenter can comprise any suitable computing device or group of computing devices, including but not limited to a discrete server or group of servers, a server or group of servers shared with other applications (such as a server of a cloud service provider), laptop or desktop computers, or any other suitable computing device or group of computing devices. Hereinafter, a distinct computing device of an ad datacenter 110 will be referred to as a "machine." Although functionality has been split between the machines of the ad datacenter 110 herein, in some embodiments the functions of these logical components may cross between machines or other physical devices.

An ad datacenter 110 contains ad campaign information outlining an ad campaign including advertisements and rules or algorithms for determining the situations in which those advertisements should be presented to a user. An ad datacenter 110, for example, receives information about an ad campaign over the network 120 from a client server 130 associated with an advertiser. The ad datacenter functions to place advertisements on webpages according to campaign rules associated with those advertisements. In some cases, the ad datacenter 110 purchases ad space in which to present advertisements on one or more webpages by bidding on the advertisement space according to campaign rules of the ad campaigns.

An ad datacenter 110 receives information about ad spaces to be bid on from one or more exchange servers 140 via the network 120. Generally, an ad data center receives large volumes of bid requests. As a singular example, the ad datacenter can receive a bid request associated with ad space from an outside server 140 associated with the ad space. A bid request is an invitation from the outside server 140 to bid on certain ad space associated with that exchange server 140. Similarly, an ad datacenter 110 receives (or has already received) information about ad campaigns from one or more client servers 130. In some embodiments, a bid request may further contain identifying information about the ad space to be bid on, for example information about the user the ad space will be presented to or information about the web site or content the ad will be presented alongside. The ad datacenter 110 then evaluates each bid request, for example comparing the bid request to one or more ad campaigns, and, depending on the result of the evaluation, may submit a bid for the ad space to the outside server 140 in a timely manner. The ad datacenter 110 may submit the ad content directly to the outside server 104 or client device to load into the winning page, or it may signal it to be retrieved from elsewhere. This may occur either as part of a bid or responsive to winning a bid. Ad datacenters 110 will be discussed further in relation to FIG. 2.

According to some embodiments, the network 120 communicatively connects the client servers 130 and outside servers 140 to the ad datacenter 110. The network 120 can be any suitable network, such as the internet, and can comprise a LAN (Local Area Network), WAN (Wide Area Network), or any other suitable type of network. The network 120 can utilize any suitable technology, such as TCP/IP or HTTP.

A client server 130 is a server capable of communicating with the advertisement datacenter 110. In some embodiments, the client server 130 is associated with a marketer or other advertiser, for example, a company using the advertisement datacenter 110 to place ads for their product or service. The client server 130 can be any suitable computing device such as a server, laptop or desktop computer, tablet, smartphone, or other suitable device able to connect to the ad datacenter 110 over the network 120. In some implementations, the client server 130 provides the ad datacenter 110 with ad creatives and campaign information (such as targeting information) that the ad datacenter can use to purchase ad space for ad campaigns associated with a marketer associated with the client server 130. For example, a client server 130 can provide ads in various formats, media types, and styles along with targeting and budget information for each ad type or the ad campaign as a whole.

Similar to the client server 130, an exchange server 140 is a server capable of communicating with the ad datacenter 110. In some embodiments, an outside server 140 is associated with one or more ad spaces for which it submits bid requests to the ad datacenter 110. Similarly, an exchange server 140 can accept bids in response to sent bid requests. After receiving and accepting a bid for advertising space, the outside server can present an ad in the ad space. An exchange server 140 can be directly associated with a web page comprising multiple ad spaces or can be associated with an ad exchange sending bid requests associated with multiple web pages. For example, an exchange server 140 can be an ad exchange which submits a bid request for associated ad spaces in real time across multiple ad spaces on multiple web pages. In some embodiments, the exchange server 140 expects a response to the bid request by a certain timing for the responding bid to be considered.

II. Ad Data Center Structure

Figure 2:
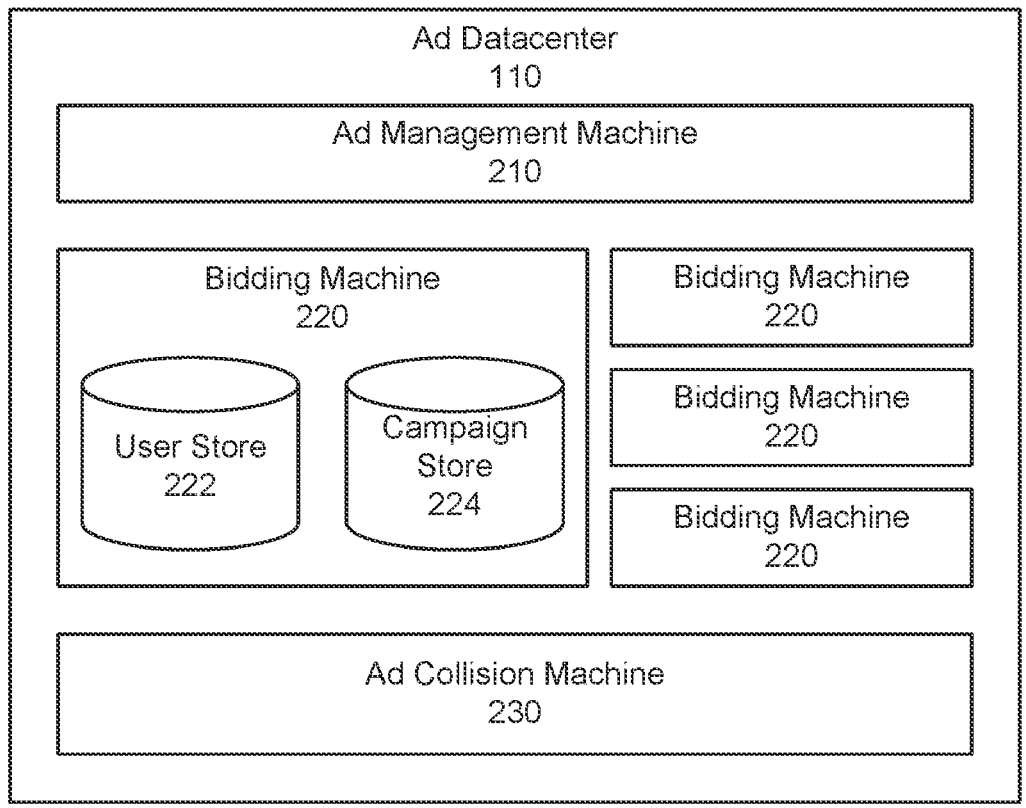
FIG. 2 is a block diagram illustrating an example ad datacenter comprising an ad collision machine, according to one embodiment.

FIG. 2 is a block diagram illustrating an example ad datacenter comprising an ad collision machine, according to one embodiment. The ad datacenter 110 of FIG. 2 includes multiple machines, including an ad management machine 210, several bidding machines 220 each comprising a user store 222 and a campaign store 224, and an ad collision machine 230.

An ad management machine 210 is a computing device capable of receiving and distributing information to other machines of the ad datacenter 110. The ad management machine 210 can be a server or another suitable machine, for example a hardware load balancer or other similar system. In some embodiments, the ad management machine 210 is configured to receive bid requests from exchange servers and assign each received bid request to a bidding machine 220 to be evaluated. For example, incoming bid requests can be distributed to bidding machines 220 based on a load on each bidding machine 220, by sequentially distributing incoming bid requests to bidding machines 220, or by randomly assigning bid requests to bidding machines 220. In some embodiments, the ad management machine 210 also submits bids in response to the received bid requests based on the bidding machine's evaluation of the bid requests. In alternative embodiments, bid requests are received directly by bidding machines 220 without the use of an ad management machine 210, and similarly the bids may be communicated directly from the bidding machines 220 outward to the requestor.

A bidding machine 220 is a computing device configured to evaluate and respond to bid requests. A bidding machine evaluates bid request based on one or more of information provided in the bid request, information known about the client device or user associated with the client device, ad campaign targeting information, and budget. In the embodiment of FIG. 2, each bidding machine 220 comprises a user store 222 and the campaign store 224, however the user store 222 and campaign store 224 can, in other embodiments, be centrally stored and accessible to all bidding machines.

The user store 222 contains information about users to which advertisements may be presented. For example, a user store 222 can contain relevant information regarding a user linked to an identifying user ID, device ID, browser ID, cookie ID, IP address, email address or any other user identification information. The user store 222 may also include other information useful for identifying whether a user would be a suitable recipient for an ad campaign. The user store 222 can also contain advertiser-provided user information, for example, user information received from a client server 130. Additionally, or alternatively, user information may also be received as part of a bid request.

A campaign store 224 stores information related to ad campaigns on behalf of which the ad datacenter 110 can bid on ad space. Information stored in relation to an ad campaign can include ad content and targeting information for presenting the ad campaign to users. For example, ad content for an ad campaign can include various advertisements related to the ad campaign, for example advertisements in different formats, form factors, mediums, or with different creative content. Targeting criteria for presenting an ad campaign can inform the bidding machine 220 under what conditions to bid on ad space related to that ad campaign, for example based on a device type, form factor of ad space, location, budget, related content, topics, or any one of a number of other factors.

A bidding machine 220 is a computing device configured to evaluate and respond to bid requests with bids, if appropriate. In some embodiments, a bidding machine 220 can evaluate bid requests by comparing information of the received bid request and user information from the user store 222 with ad campaign targeting information stored in the campaign store 224. A bidding machine 220 can evaluate a bid request by first comparing known information about the user associated with the bid request with targeting information associated with the ad campaigns of the campaign store 224. In some embodiments, given information about the user included in the bid request is supplemented with additional user information from the user store 222. Based on this analysis, the bidding machine 220 can then determine the top N most suitable advertisements (or ad campaigns more generally) for the bid request, each advertisement associated with an ad campaign.

For example, when a bid request is received, the information provided in the bid request is extracted and relevant information in the user store 222 is retrieved and used to supplement the information provided with the bid request. If a user ID cannot be retrieved for the user information of the bid request, a user ID may be generated based on the available user information from the bid request and stored in the user store 222 associated with the available user identification information. Then, the bid request and relevant user store 222 information is used to select ad campaigns whose targeting info matches that of the bid request. A variety of different processes may be used to select the ad campaigns. For example, the selection may occur starting by comparing to the targeting rules of ad campaigns in the campaign store 224. This set of suitable ad campaigns may be narrowed to ad campaigns associated with ad content suitable for the form factor of the bid request, for example, ads with the right size and media type for the ad space associated with the bid request. Then, the ad campaigns may be ranked by available budget/bid price and the top N campaigns are selected. For example, the bidding machine 220 can conduct an internal auction between the suitable ad campaigns where the N highest bidding ad campaigns are selected as the top N ad campaigns. In practice, the manner of selection of ad campaigns in the running for bidding may vary significantly, and the remainder of this description does not depend on any particular process.

Bidding machines 220 are often multithreaded, that is, a processor associated with bidding machines 220 is able to execute instructions for multiple tasks simultaneously. According to some implementations, multithreaded bidding machines 220 are able to simultaneously evaluate multiple bid requests. Although multithreading leads to each bidding machine 220 being more efficient in evaluating bid requests, it can also contribute to ad collisions. Bid requests for ad spaces on the same page will likely be very similar in targeting information, as bid requests for the same page generally share the same user and will be presented alongside similar content. Similarly, multiple bid requests associated different ad spaces on the same page will be received by bidding machines (or a single bidding machine) simultaneously, or near simultaneously. Because multiple threads operating with very similar information will likely select the same ad campaigns to respond to each bid request, ad collisions will occur if not prevented. This results in a situation similar to ad collisions between different bidding machines 220 of the same ad datacenter 110. Further, each ad datacenter 110 can include multiple bidding machines 220, each with multiple threads. Therefore, not only can ad collisions occur between threads of a single bidding machine 220, but also between threads across different bidding machines 220.

To reduce the probability of ad collisions, the bidding machine 220 forwards a "collision query" including a ranked list of the top N ad campaigns to the ad collision machine 230 prior to submitting a bid in response to a received bid request. The ad collision machine 230 evaluates the received top N ad campaigns for a given bid request and returns the highest-ranking campaign (or campaigns, according to some embodiments) that is not likely to cause an ad collision. Then, the bidding machine 220 can respond to the bid request with the highest available ranking campaign returned by the ad collision machine 230. As used herein, an "available" ad campaign in the context of a bid request is unlikely to generate an ad collision if bid on in response to the bid request.

An ad collision machine 230 is a computing device configured to reduce or eliminate ad collisions occurring among the bidding machines 220 (and their threads) of the ad datacenter 210. An ad collision machine 230 can receive user information indicating which page each bid request corresponds to as well as information about suitable ad campaigns to fill the associated ad space. Based on this information, the ad collision machine 230 can determine which (if any) of the suitable ad campaigns to recommend bidding on as "available" for each bid request. Due to time sensitivity to respond to a bid request, in some implementations the ad collision machine 230 is configured to not add significant time to the evaluation of each bid request.

The exact criteria for determining whether two ad spaces can cause a collision may vary by implementation. This may be on a web-page by web-page basis, a per-software-application display basis, or other criteria. In one embodiment, user identifying information is used to infer which bid requests are related to the same web page, however, in other embodiments, URL information or any other suitable information can be used to determine which ad spaces are on the same web page.

Figure 3:
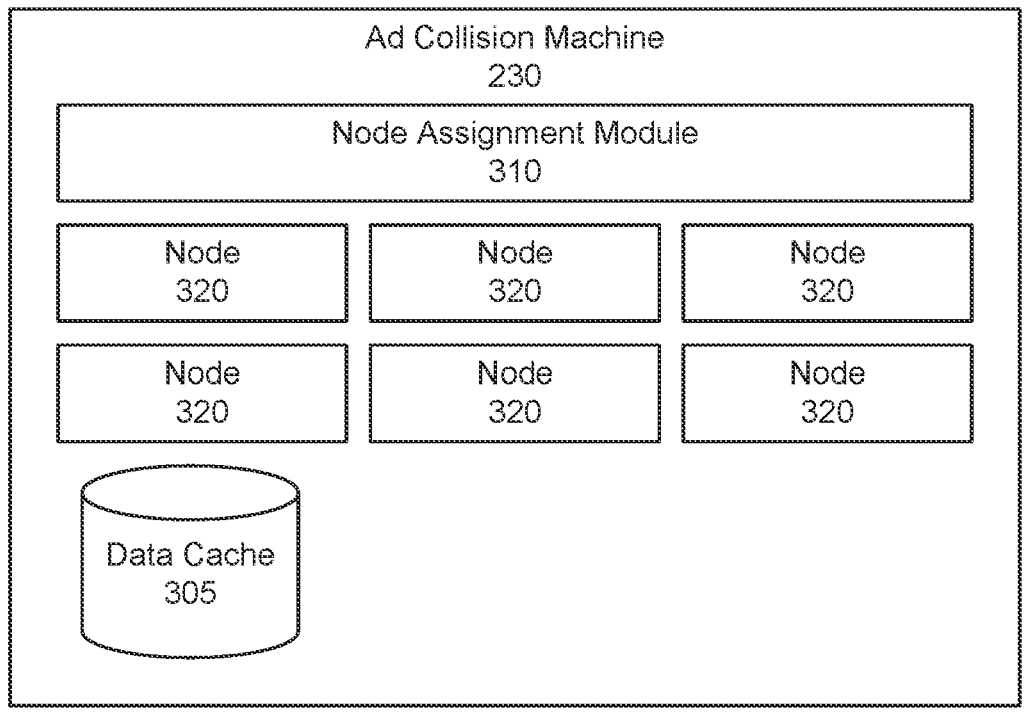
FIG. 3 is a block diagram illustrating an examiner ad collision machine, according to one embodiment.

FIG. 3 is a block diagram illustrating an example ad collision machine 210, according to one embodiment. The ad collision machine 230 of FIG. 3 comprises a data cache 305, a node assignment module 310, and several nodes 320.

The data cache 305 stores information relating to active or potential bids and/or bid requests to be responded to. The data cache 305 stores linked campaign and user information associated with bids submitted by a bidding machine 220 of the ad datacenter 110 or potential bids to be submitted by a bidding machine 220 of the ad datacenter 110. For example, the data cache 305 can store user-campaign pairs of the form user IDI Campaign ID identifying the user and campaign for which a bid is to be submitted from a bidding machine 220 (a potential bid). In some embodiments, entries of the data cache 305 are flushed after a predetermined period of time, for example 5 seconds. In some embodiments, each data entry in the data cache 305 has a lifespan of 5 seconds, alternatively, the entire data cache 305 can be flushed every 5 seconds. The lifetime of entries in the data cache 305 may be chosen to expire closely after all bid requests associated with a single page or item of content have been evaluated by the ad collision machine 230. Excessive lifetime of data entries of the data cache 305 can lead to ad placements being restricted for unrelated additional bid requests relating to the same user and campaign, for example, bid requests generated from a subsequent click or page request of the user. The data cache 305 can be any suitable database or table structure and can employ any suitable database organization method.

Although only one data cache 305 is illustrated, each node 320 of the ad collision machine 230 may comprise an individual data cache 305 for that node. According to some implementations, user ID—campaign ID pairs in the data cache 305 are associated with anode 320 are not accessed by other nodes 320, for example, because user ID—campaign ID pairs can be assigned to nodes to be evaluated based on user ID. Therefore, data can be stored in the data cache 305 of that node 320. Associating each node 320 with an individual data cache can reduce the complexity involved in managing a central data cache 305 for all the nodes 320. For example, the data cache 305 can be part of a clustered database structure such as a REDIS in-memory data structure store.

The node assignment module 310 can receive information regarding collision queries and assigns each collision query to an appropriate node 320 for evaluation. In some embodiments, collision queries are specifically formatted to be evaluated by a node 320. The node assignment module can, in some embodiments, receive user identification information and an ordered list of campaigns and format the received information into a specifically formatted collision query. Additionally, or alternatively, the node assignment module 310 can directly receive properly formatted collision queries from the bidding machines 220. For example, a collision query can be of the format userIDi campaignID_1i campaignID_2l campaignID_3i_campaignID_n. In some embodiments, collision queries are additionally time-stamped.

In one implementation, collision queries, are assigned to nodes 320 based on user ID, so all collision queries associated with the same user H) are assigned to the same node 320 for evaluation. To assign a collision query to a node 320, in one implementation the node assignment module 310 separates the user ID from the rest of the collision query and assigns the collision query to a node 320 based on the separated user ID. For example, the collision query can be assigned to a node based on a formula such as hash(userID) mod(total number of nodes in machine 230) This formula assigns the collision query to a node based on a hash of the userID, which can normalize the length and format of the user ID across different user H) types. After determining a node assignment, the node assignment module 310 forwards the collision query to the correct node 320 for evaluation. In an alternate implementation, collision queries are forwarded directly to a node 320 of the ad collision machine 230, which can perform the functions of the node assignment module 310 and subsequently evaluate the collision query (if appropriate) or forward the collision query to the correct node for evaluation.

In one embodiment, a node 320 is a single threaded computing module or single thread of a computing module capable of evaluating a collision query for potential ad collisions. Each node 320 executes a script to evaluate each incoming collision query for potential ad collisions. In one specific embodiment, to evaluate a collision query with the format userIDI campaignID_1i campaignID_2l campaignID_3I. IcampaignID_n the node 320 can query the data cache 305 for user ID—campaign ID pairs starting from userIDI campaignID_1 and proceeding to userIDI campaignID_n. If a user ID—campaign ID pair is already stored in the data cache 305 it is determined to be not available and the node 320 can move on to search for the next user ID—campaign ID pair. If a user ID—campaign ID pair is not already stored in the data cache 305 it is determined to be available and a response to the collision query can be returned to the bidding machine 220. In order to prevent future ad collisions for this web page, the user ID—campaign ID pair can then be written to the data cache 305 and the node 320 can proceed to evaluate the next collision query.

Because each node 320 is single threaded, multiple collision queries assigned to a node 320 and originating from multiple bidding machines (and/or multiple bidding machines threads) are evaluated in sequential order, with the evaluation of each collision query beginning only after the prior collision query is completely evaluated. For this reason, the data cache 305 will (if appropriate) be already updated with each user ID—campaign ID pair as a potential bid is submitted for that user ID—campaign ID pair, but before subsequent collision queries are evaluated by that node 320. Therefore, single-threaded nodes 320 enable the subsequent collision queries to be evaluated in light of information placed in the data cache 305 by even the immediately preceding collision query evaluated by that node 320. However, the multiple nodes within the ad collision machine 320 allow timely evaluation of collision queries from different users without the possibility of simultaneous evaluation leading to ad collisions, as all collision queries associated with a user are associated with a single node 320.

For example, an ad collision machine 230 can comprise a key-value database such as a REDIS (REmote Dictionary Server) database duster. A REDIS is a single threaded key-value store. For example, a REDIS instance can be a node 320 of the ad collision machine 230. Multiple REDIS instances can be associated to form a REDIS cluster. In the embodiment described above, each REDIS instance is assigned tasks based on a given range of hash keys. The REDIS cluster can therefore be customized to assign collision queries to threads based on, for example user ID information. Collision queries can be forwarded directly to a REDIS instance of the REDIS cluster which can determine which REDIS instance should evaluate that collision query and forward the collision query to the correct REDIS instance for evaluation as appropriated. In some implementations, the bidding machines 220 keep track of which REDIS instance collision queries are associated with a specific user ID and route subsequent queries for that user ID to the correct REDIS instance.

III. Example Ad Collision Management Implementation

Figure 4A:
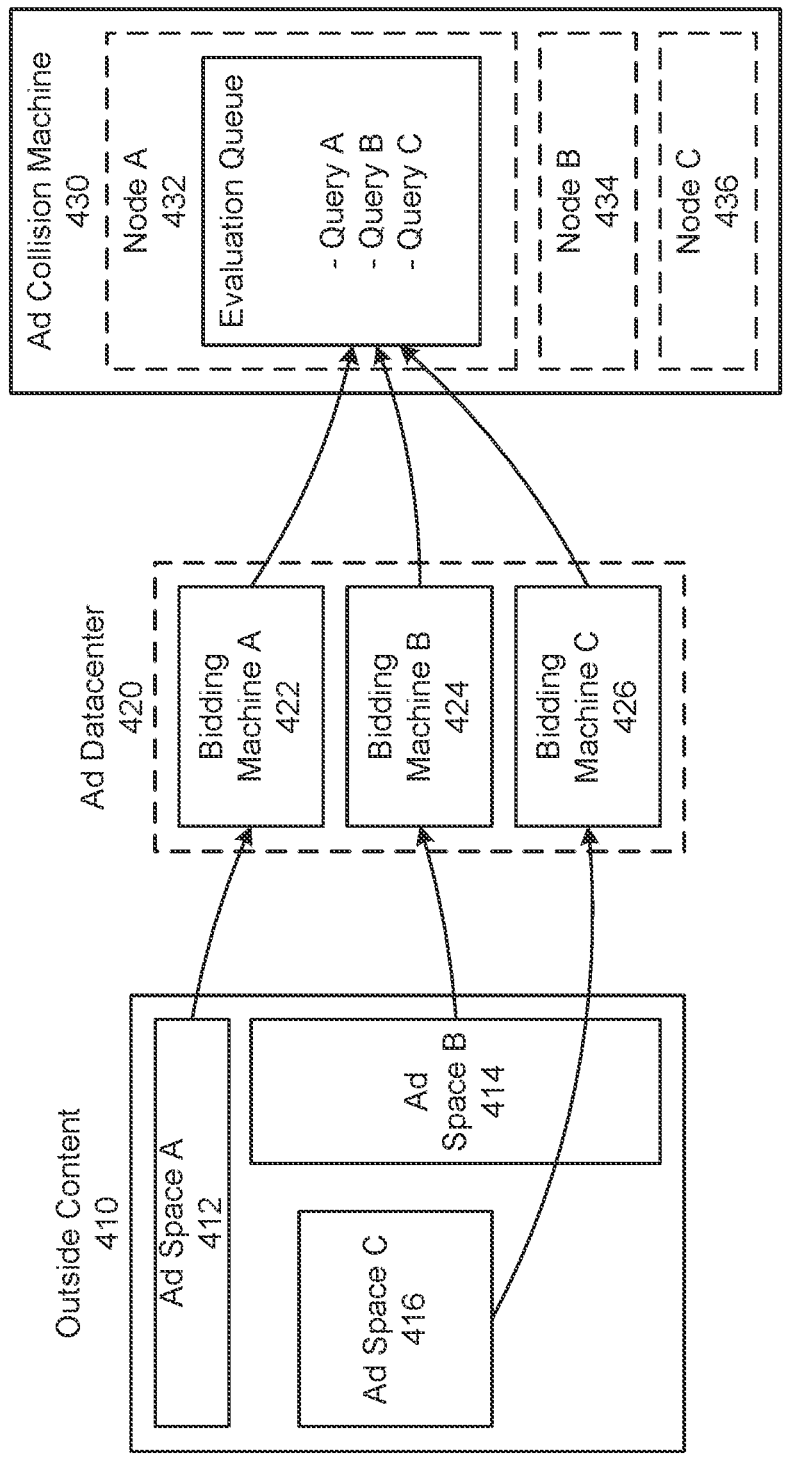
FIG. 4A illustrates an example relationship between outside content, an ad datacenter and an ad collision machine, according to one embodiment.

FIG. 4A illustrates an example relationship between outside content, an ad datacenter and an ad collision machine, according to one embodiment. The environment of FIG. 4A includes outside content 410 comprising ad spaces A 412, B 414, and C 416, an ad datacenter 420 comprising bidding machines A 422, B 424, and C 426, and an ad collision machine 430 comprising nodes A 432, B 434, and C 436.

According to this example, the outside content 410 is a web page comprising the ad spaces A 412, B 414, and C 416. The web page 410 can contain additional content relating to one or more topics (not shown) that will be displayed alongside the ad spaces 412-416. In the embodiment of FIG. 4A, the outside content 410 is to be presented to a specific viewing user, for example, in response to a request submitted by the specific viewing user. Therefore, advertisements must be solicited to fill the ad spaces 412-416 when the outside content 410 is resented to the specific viewing user. Thus, for each of the ad spaces 412-416 an individual bid request is generated containing information about the ad space itself, information about the outside content, and information about the specific viewing user to which the outside content 410 will be presented. The bid requests can be generated, for example, at an publisher broker, exchange server 140, or other suitable server associated with the outside content 410.

The ad datacenter 420, as discussed above, comprises several bidding machines, each of which is configured to evaluate and respond to received bid requests. In the example of FIG. 4A, the bid request associated with the ad space A 412 is received by the bidding machine A 422, the bid request associated with the ad space B 414 is received by the bidding machine B 424, and the bid request associated with the ad space C 416 is received by the bidding machine C 426. As described above, each of the bidding machines A 422, B 424, and C 426 evaluate their respective bid requests to independently determine the top N ad campaigns for display in each ad space 412416 associated with the bid requests. For example, the bidding machine A 422 evaluates the bid request associated with the ad space 412 to determine the top N campaigns to display ads in the ad space 412. In this example, because the ad spaces A 412, B 414, and C 416 are all to be viewed by the same specific viewing user and accompany the same content on the same outside content 410 web page, it is likely that the bidding machines 422-426 will determine the same top N ad campaigns for each of the bid requests associated with the ad spaces 412-416. In some implementations, each bidding machine 422-424 determines and/or assigns a user ID to each of the bid requests based on information about the specific viewing user. In this example, because the specific viewing user is the same for each of the ad spaces 412-416, each of the associated bid requests will be associated with the same user ID. Prior to submitting a bid on any of the top N ad campaigns for a bid request, each bidding machine 422-426 submits a collision query comprising the user ID and the top N campaigns to the ad collision machine 430.

According to some embodiments, the ad collision machine 430, as discussed above, comprises multiple nodes configured to evaluate collision queries for potential ad collisions. In the embodiment of FIG. 4A, collision queries are assigned nodes for evaluation based on user ID information. Therefore, because bid requests (and therefore collision queries) associated with the ad spaces 412-416 share a user ID, the bid request associated with the ad spaces A 412, B 414, and C 416 are all associated with the same node, in this case the node A 432. As mentioned above, the nodes 432-436 are single threaded, so the collision queries will be evaluated sequentially based on which collision query was first received by the node A 432 (or by any other suitable order).

For example, the evaluation queue of node A 432 is in the order query A, query B, query C. In the embodiment of FIG. 4A, query A is received from the bidding machine A 422 and is the associated with the bid request for the ad space A 412. Similarly, query Bis received from the bidding machine B 424 and is the associated with the bid request for the ad space B 414 and query C is received from the bidding machine C 426 and is the associated with the bid request for the ad space C 416. As mentioned above, because the ad spaces A 412, B 414, and C 416 are all to be viewed by the same specific viewing user and accompany the same content on the same outside content 410 web page, it is likely that the bidding machines 422-426 will determine the same top N ad campaigns for each of the bid requests associated with the ad spaces 412416, and therefore that each of the corresponding queries will contain the same top N ad campaigns.

The query A, associated with the ad space A 412, is first evaluated by node A 432 of the ad collision machine 430. To evaluate the query A, the node 432 first checks for the userID—first campaign ID pair In this example, no previous bid requests associated with this user have been recently received, so the user ID—first campaign ID pair is not found within the data cache. Therefore, the node A 432 writes the user ID—first campaign H) pair to the data cache and returns the user ID—first campaign ID pair to the bidding machine A 422 as available to bid on.

Next, the query B, associated with the ad space B 414, is evaluated by the node A 432. Similarly, to evaluate the query B, the node 432 first checks for the user ID—first campaign ID pair. However, because this key was just written to the data store as part of the evaluation of query A, the node 432 indicates that the user ID—first campaign ID pair matches an existing key of the data store. Therefore, the node 432 constructs the user ID—second campaign ID pair and searches the data cache 305 for a match. In the embodiment, of FIG. 4A, no match to the user ID—second campaign ID pair is found within the data cache. Therefore, the node A 432 writes the user ID—second campaign ID pair to the data cache and returns the user ID—second campaign ID pair to the bidding machine B 424 as available to bid on. A similar process is undertaken to evaluate the query C, and the node A 432 eventually writes the user ID—third campaign ID pair to the data cache and returns the user ID—third campaign ID pair to the bidding machine C 426 as available to bid on.

Figure 4B:
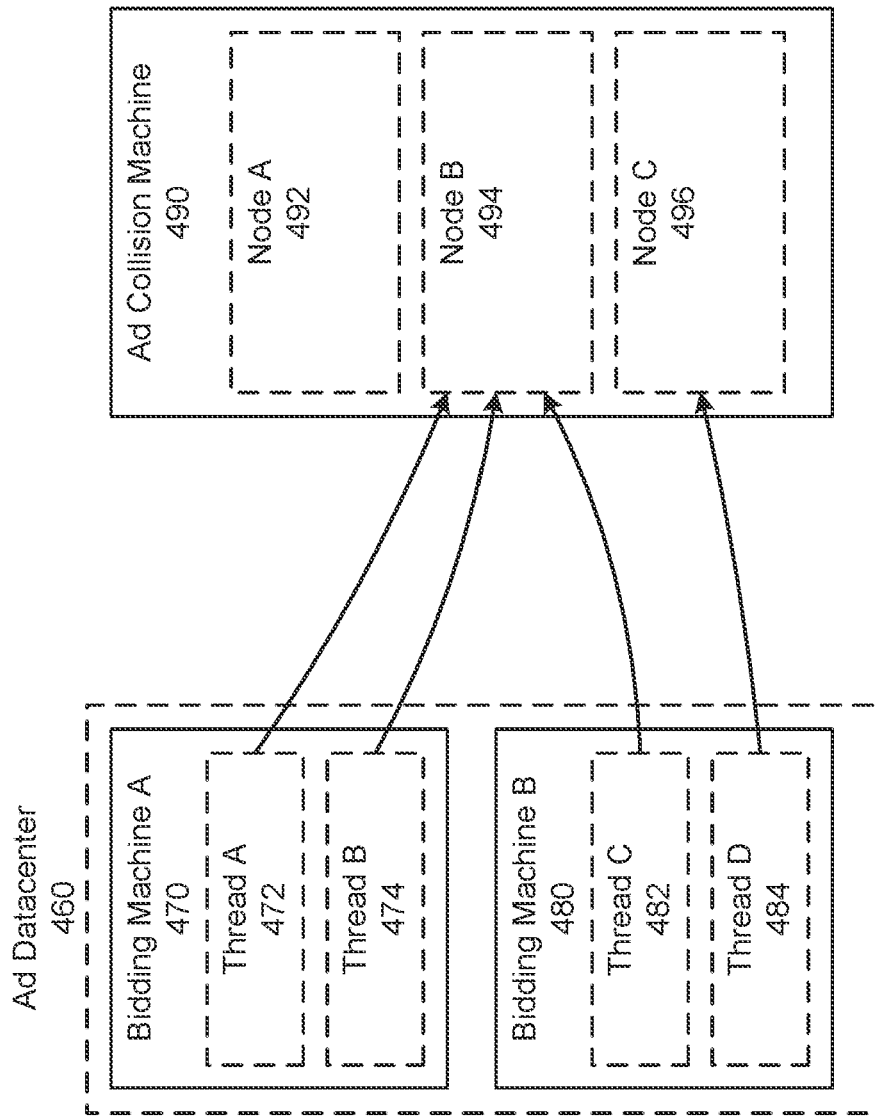
FIG. 4B illustrates an example relationship between ad machines within an ad datacenter and an ad collision machine, according to one embodiment.

FIG. 4B illustrates an example relationship between ad machines within an ad datacenter and an ad collision machine, according to one embodiment. The environment of FIG. 4B includes an ad datacenter 460 comprising several bidding machines and an ad collision machine 490 comprising nodes A 492, B 494, and C 496. In the embodiment of FIG. 4B, each of the bidding machines of the ad datacenter 460 include multiple threads; bidding machine A 470 comprises threads A 472 and B 474 and bidding machine B 480 comprises threads C 482 and D 484.

As discussed above, bidding machines 220 can be multithreaded, and evaluation of bid requests can occur simultaneously on each of the threads. For example, unique bid requests can be simultaneously evaluated on the threads A 472 and B 474 of the bidding machine A 470. In some embodiments, collision queries are assigned to nodes of an ad collision machine, such as the ad collision machine 490, based on a user ID associated with the collision query, irrespective of the bidding machine or thread from which the collision query originated. In the embodiment of FIG. 4B, bid requests are being simultaneously evaluated at the threads A 472, B 474, C 482, and D 484 of the bidding machines A 470 and B 480. In this case each thread 472-474 and 482-484 submits a collision query to the ad collision machine 490 which is routed to one of the nodes 492-496 of the ad collision machine 490. In the embodiment of FIG. 4B, collision queries associated with the threads A 472, B 474, and C 482 are each associated with the same user ID and are assigned to the same node, the node B 494. However, the collision query associated with the thread D 484 is associated with a different user ID than the other submitted collisions queries and is in this case assigned to the node C 496.

IV. Exemplary Effects of Ad Collision Management

Figure 5B:
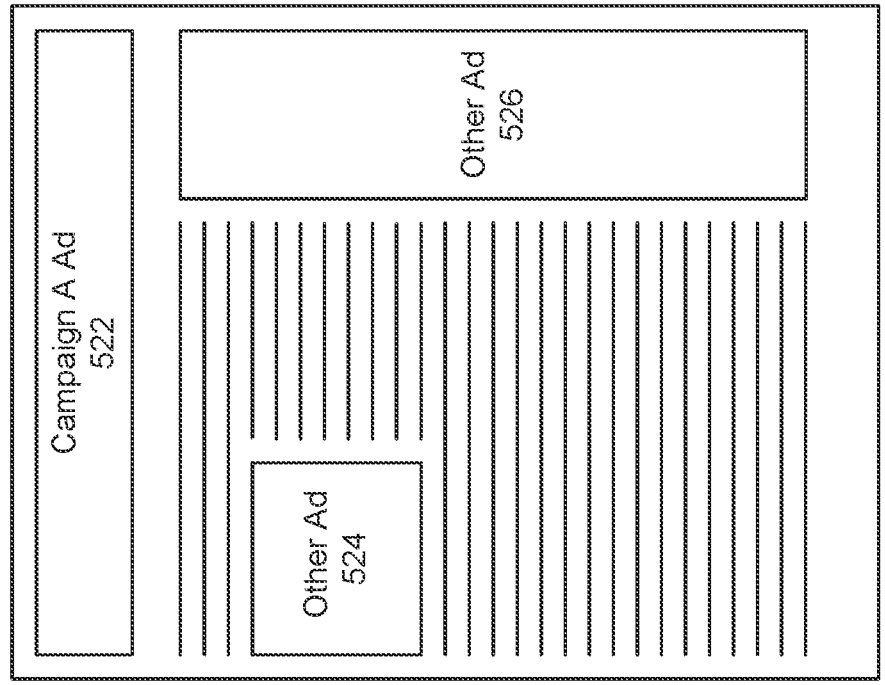
FIG. 5B illustrates an example content page with ad collision management, according to one embodiment.
Figure 5A:
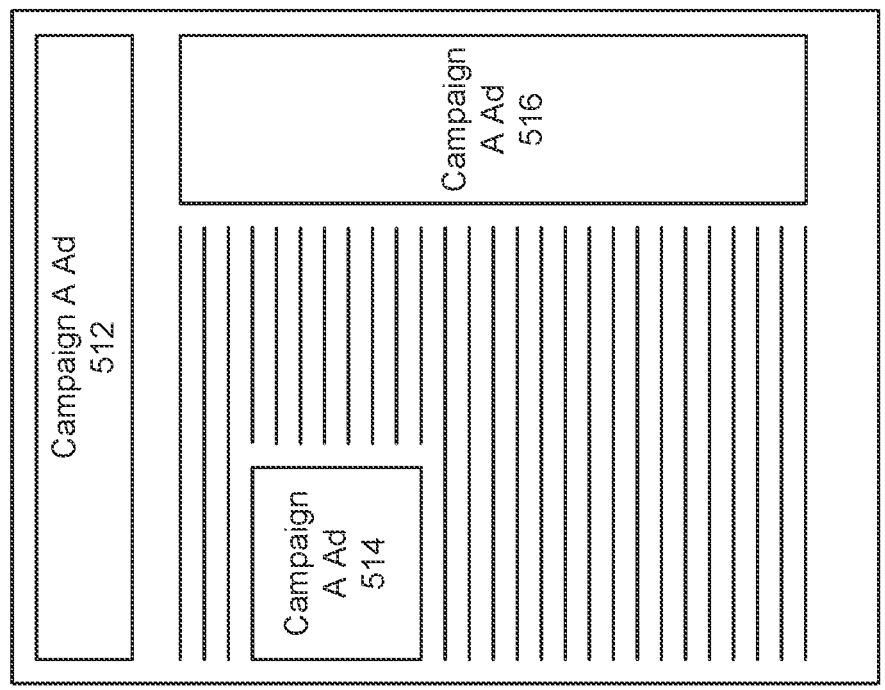
FIG. 5A illustrates an example content page without ad collision management, according to one embodiment.

FIG. 5A illustrates an example content page without ad collision management, according to one embodiment. The content page without ad collision management 510 of FIG. 5A comprises a content page including campaign A ads 512, 514, and 516. Similarly, FIG. 5B illustrates an example content page with ad collision management, according to one embodiment. The content page with ad collision management 520 of FIG. 5B comprises a content page including the campaign A ad 522 as well as other ads 514 and 516.

In the example of FIG. 5A, ad spaces on the content page without ad collision management are filled with advertisements from the same ad campaign. Each of the campaign A ads 512-516 may be less effective by being presented in such close proximity to other advertisements associated with campaign A. That is, while three ads associated with the campaign A displayed on the same page may be more effective than one ad associated with campaign A, it is not three times as effective, but costs three time the budget. In contrast, in FIG. 5B, only one ad from ad campaign A, the campaign A ad 522 is present in the content page with ad collision management 520. This allows the budget that was spent on the campaign A ads 514 and 516 in the example of FIG. 5A to be spent on advertisements on other content pages in the example of FIG. 5B.

Figure 6:
FIG. 6 is a graph illustrating the rate of ad collisions over time in a system implementing ad collision management, according to one embodiment.

FIG. 6 is a graph illustrating the rate of ad collisions over time in a system implementing ad collision management, according to one embodiment. The graph 600 of FIG. 6 shows the improvement in the rate of ad collisions within advertisements placed by an advertisement datacenter 110 as ad collision management techniques are implemented within the ad datacenter 110.

V. Example Processes for Ad Collision Management

Figure 7:
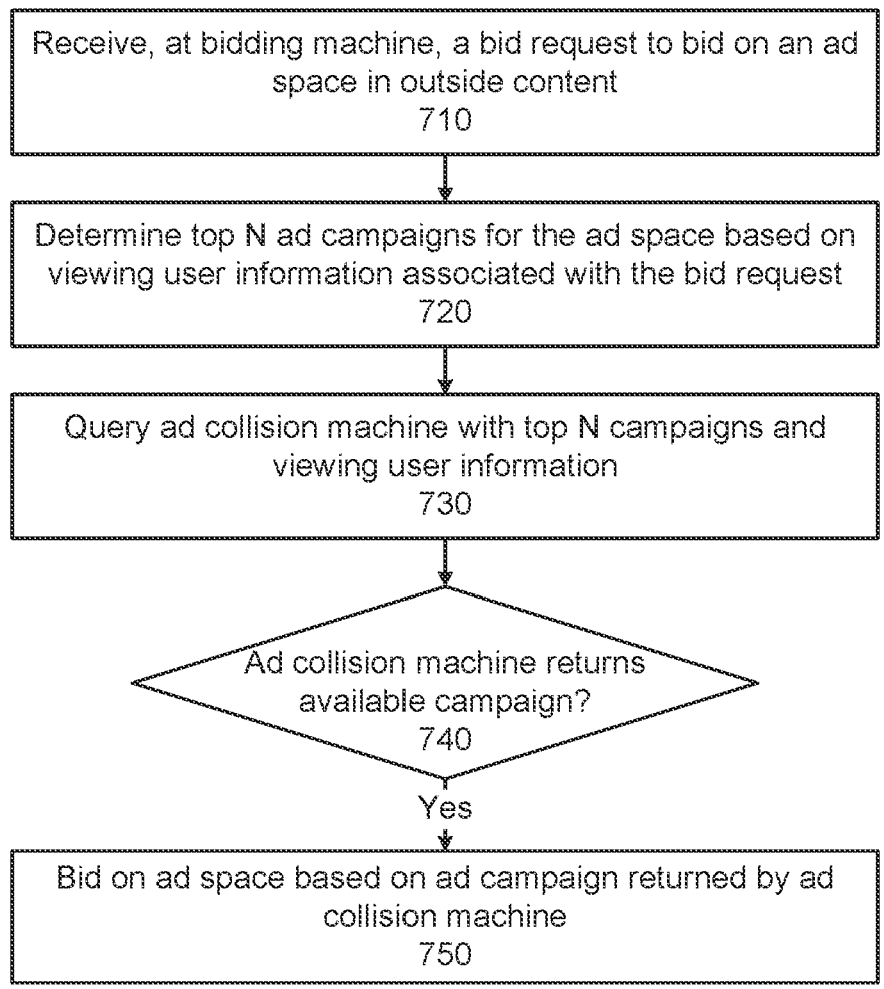
FIG. 7 is a flowchart depicting a process for using ad collision management while bidding on ad space in response to a bid request, according to one embodiment.

FIG. 7 is a flowchart depicting a process for using ad collision management while bidding on ad space in response to a bid request, according to one embodiment. The process 700 of FIG. 7 begins when a bidding machine receives 710 a bid request to bid on an ad space on an outside webpage. The bidding machine can then determine 720 the top N ad campaigns to be presented in the ad space based on information, such as viewing user information, included with the bid request. The bidding machine then queries 730 an ad collision machine, including the top N campaigns and viewing user information. For example, the bidding machine can submit a collision query comprising a user ID and a ranked list of the top N campaigns to the ad collision machine. If the ad collision machine returns 740 an available ad campaign, the bidding machine will bid on the ad space, for example by responding to the bid request, based on the ad campaign returned by the ad collision machine.

Figure 8:
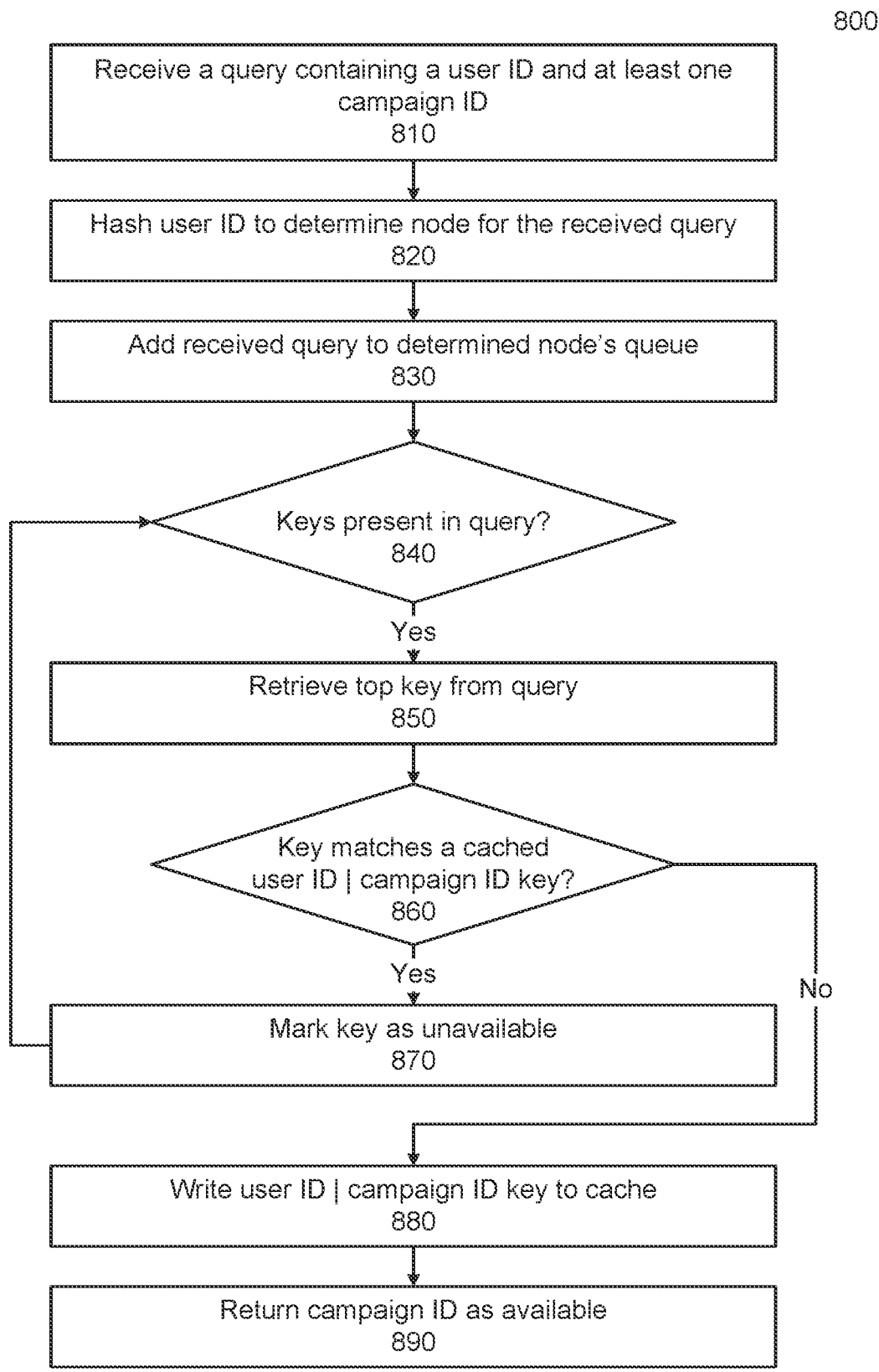
FIG. 8 is a flowchart depicting a process for preventing ad collisions at an ad datacenter, according to one embodiment.

FIG. 8 is a flowchart depicting a process for preventing ad collisions at an ad datacenter, according to one embodiment. The process 800 of FIG. 8 begins when an ad collision machine receives 810 a query containing a user ID and at least one campaign ID. The user ID can then be hashed 820 to determine a node to assign the received query to and add 830 the received query to the determined nodes queue. When the query is at the top of the determined node's queue, the node then determines if keys are present 840 in the query. If so, the "top" user IDI campaign ID key is retrieved 850 from the query. For example, the "top" user IDI campaign ID key can be the pairing of the user ID with the highest ranked campaign ID that has not yet been evaluated for this query. The node then determines if the retrieved key matches 860 a user IDI campaign ID key already stored in the ad collision data cache. If the retrieved key does match, the key is marked 870 as unavailable and the process continues from the step 840 with the next user IDI campaign ID key from the query. If the retrieved key does not match existing keys in the ad collisions data cache, the user ID! campaign ID key is written 880 to the cache, and the campaign ID of the key is returned 890 as available.

VI. Additional Considerations

Various embodiments of the invention may be implemented as a program product for use with a computer system. The program(s) of the program product include instruction define functions of the embodiments (including the methods described herein) and can be contained on a variety of non-transitory computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to various embodiments of the present invention, other and further embodiments of the invention may be devised without departing from the basic scope thereof, and the scope thereof is determined by the claims that follow.

The invention claimed is:

1. A method in a content display space collision machine comprising:
   a plurality of machine nodes each machine node capable of evaluating a content display space collision query, a machine node assignment module, and a data cache for each of the machine nodes, each data cache containing a plurality of keys that are associated with a particular machine node;
   the method comprising, at the content display space collision machine:
   receiving a first query comprising a user ID and one or more content display strategy IDs;
   identifying using the machine node assignment module and based on the user ID a selected one of the machine nodes;
   assigning the received first query to the selected machine node for evaluation;
   retrieving, at the selected machine node, a first key from the received first query, the first key comprising the user ID and a first one of the content display strategy IDs;
   determining, at the selected machine node, the first key matches a key stored in the data cache of the selected machine node; and
   returning an indication that the user ID and first content display strategy ID associated with the first query are unavailable.

2. The method of claim 1, wherein receiving a first query comprising a user ID and one or more content display strategy IDs comprises receiving, at the content display space collision machine, a plurality of queries, the plurality of queries comprising the first query and a second query comprising a user ID and one or more content display strategy IDs and wherein the method of claim 1 further comprises:
   identifying, based on the user ID of the second query, a selected one of the machine nodes;
   assigning the received second query to the selected machine node for evaluation;
   retrieving, at the selected machine node, a second key from the received second query, the second key comprising the user ID of the second query and a second one of the content display strategy IDs; and
   determining, at the selected machine node, if the second key matches a key stored in the data cache of the selected machine node.

3. The method of claim 2, further comprising:
   retrieving, at the selected machine node, a third key from the received second query, the second key comprising the user ID of the second query and a third one of the content display strategy IDs; and
   determining, at the selected machine node, if the third key matches a key stored in the data cache of the selected machine node.

4. The method of claim 2, wherein the first query and second query are evaluated in sequence such that evaluation of the second query begins after the content display space collision machine returns a response to the first query.

5. The method of claim 1, wherein returning the indication comprises:
   transmitting the user ID and first content display strategy ID associated with the first key to a bidding machine configured to respond to a bid request associated with the user ID with a bid including an advertisement associated with the first content display strategy ID.

6. The method of claim 1, further comprising:
   flushing the data cache of at least one of the machine nodes to clear stored keys older than a threshold amount of time.

7. The method of claim 1, further comprising:
   flushing the data cache of at least one of the machine nodes to clear all stored keys after a period of time.

8. The method of claim 1, wherein identifying, based on the user ID, a selected one of the machine nodes comprises:
   identifying the selected machine node based on the user ID and a modulus of a total count of the machine nodes.

9. The method of claim 1, wherein the first query further comprises a ranked list of the one or more content display strategy IDs.

10. A non-transitory computer readable storage medium comprising instructions which, when executed by a processor, cause the processor to perform operations comprising, at least:
    receiving, at a content display space collision machine, a first query comprising a user ID and one or more content display strategy IDs, the content display space collision machine comprising a plurality of machine nodes, a machine node assignment module, and a data cache for each of the machine nodes, each data cache containing a plurality of keys that are associated with a particular machine node;
    identifying, based on the user ID and using the machine node assignment module, a selected one of the machine nodes;
    assigning the received first query to the selected machine node for evaluation;
    retrieving, at the selected machine node, a first key from the received first query, the first key comprising the user ID and a first one of the content display strategy IDs,
    determining, at the selected machine node, the first key matches a key stored in the data cache of the selected machine node; and
    returning an indication that the user ID and first content display strategy ID associated with the first query are unavailable.

11. The non-transitory computer readable storage medium of claim 10, wherein receiving a first query comprising a user ID and one or more content display strategy IDs comprises receiving, at the content display space collision machine, a plurality of queries, the plurality of queries comprising the first query and a second query comprising a user ID and one or more content display strategy IDs and wherein the non-transitory computer readable storage medium of claim 10 further comprises instructions which, when executed by the processor, cause the processor to perform further operations comprising, at least:

identifying, based on the user ID of the second query, a selected one of the machine nodes;

assigning the received second query to the selected machine node for evaluation;

retrieving, at the selected machine node, a second key from the received second query, the second key comprising the user ID of the second query and a second one of the campaign content display strategy IDs; and determining, at the selected machine node, if the second key matches a key stored in the data cache of the selected machine node.

12. The non-transitory computer readable storage medium of claim 11 further comprising instructions which, when executed by the processor, cause the processor to perform further operations comprising, at least:

retrieving, at the selected machine node, a third key from the received second query, the second key comprising the user ID of the second query and a third one of the content display strategy IDs; and determining, at the selected machine node, if the third key matches a key stored in the data cache of the selected machine node.

13. The non-transitory computer readable storage medium of claim 11, wherein the first query and second query are evaluated in sequence such that evaluation of the second query begins after the content display space collision machine returns a response to the first query.

14. The non-transitory computer readable storage medium of claim 10, wherein returning the indication comprises:

transmitting the user ID and first content display strategy ID associated with the first key to a bidding machine configured to respond to a bid request associated with the user ID with a bid including an advertisement associated with the first content display strategy ID.

15. The non-transitory computer readable storage medium of claim 10 further comprising instructions which, when executed by the processor, cause the processor to perform:

flushing the data cache of at least one of the machine nodes to clear stored keys older than a threshold amount of time.

16. The non-transitory computer readable storage medium of claim 10, wherein identifying, based on the user ID, a selected one of the machine nodes comprises:

identifying the selected machine node based on the user ID and a modulus of a total count of the machine nodes.

17. A content display space collision machine comprising:
a plurality of machine nodes each machine node capable of evaluating a collision query;
a machine node assignment module;
a data cache for each of the machine nodes, each data cache containing a plurality of keys that are associated with a particular machine node;
a memory that stores instructions; and
one or more processors configured by the instructions to perform operations comprising:

receive a first query comprising a user ID and one or more content display strategy IDs;

identify, based on the user ID and the machine node assignment module, a selected one of the machine nodes;

assign the received first query to the selected machine node for evaluation;

retrieve a first key from the received first query, the first key comprising the user ID and a first one of the content display strategy IDs;

determine the first key matches a key stored in the data cache of the selected machine node; and return an indication that the user ID and first content display strategy ID associated with the first query are unavailable.

18. The machine of claim 17, wherein receiving a first query comprising a user ID and one or more content display strategy IDs comprises receiving, at the machine node assignment module, a plurality of queries, the plurality of queries comprising the first query and a second query comprising a user ID and one or more content display strategy IDs and wherein:

the machine node assignment module further configured to:

identify, based on the user ID of the second query, a selected one of the machine nodes;

assign the received second query to the selected machine node for evaluation; and the machine node further configured to:

retrieve a second key from the received second query, the second key comprising the user ID of the second query and a second one of the content display strategy IDs, and determine, at the selected machine node, the second key matches a key stored in the data cache of the selected machine node.

19. The machine of claim 18, wherein the machine node is further configured to, responsive to determining that the second key matches a key stored in the data cache of the content display space collision machine:

retrieve a third key from the received second query, the second key comprising the user ID of the second query and a third one of the content display strategy IDs; and determine if the third key matches a key stored in the data cache of the selected machine node.

20. The machine of claim 17, wherein returning the indication comprises:

transmitting the user ID and first content display strategy ID associated with the first key to a bidding machine configured to respond to a bid request associated with the user ID with a bid including an advertisement associated with the first content display strategy ID.

\* \* \* \* \*

UNITED STATES PATENT AND TRADEMARK OFFICE
CERTIFICATE OF CORRECTION

PATENT NO. : 11,798,041 B2
APPLICATION NO. : 17/556922
DATED : October 24, 2023
INVENTOR(S) : Zou et al.

Page 1 of 2

It is certified that error appears in the above-identified patent and that said Letters Patent is hereby corrected as shown below:

In the Specification

In Column 1, Line 67, delete "quelies" and insert --queries-- therefor

In Column 2, Line 60, delete "data centers" and insert --datacenters-- therefor

In Column 4, Line 3, delete "data center" and insert --datacenter-- therefor

In Column 4, Line 21, delete "104" and insert --140-- therefor

In Column 5, Line 1, delete "Data Center" and insert --Datacenter-- therefor

In Column 7, Line 18, delete "210." and insert --110.-- therefor

In Column 7, Line 38, delete "210," and insert --230,-- therefor

In Column 8, Line 3, delete "anode" and insert --a node-- therefor

In Column 8, Line 31, delete "H)" and insert --ID-- therefor

In Column 8, Line 40, delete "userID." and insert --user ID,-- therefor

In Column 8, Line 41, delete "H)" and insert --ID-- therefor

In Column 9, Line 20, delete "320" and insert --230-- therefor

In Column 10, Line 15, delete "412416" and insert --412-416-- therefor

In Column 10, Line 53, delete "Bis" and insert --B is-- therefor

Signed and Sealed this
Twenty-second Day of October, 2024

Katherine Kelly Vidal
*Director of the United States Patent and Trademark Office*

CERTIFICATE OF CORRECTION (continued)
U.S. Pat. No. 11,798,041 B2

In Column 10, Line 63, delete "412416," and insert --412-416,-- therefor

In Column 11, Line 1, delete "userID" and insert --user ID-- therefor

In Column 11, Line 5, delete "H)" and insert --ID-- therefor

In Column 12, Line 2, delete "514 and 516." and insert --524 and 526.-- therefor In Column 12, Line 62, delete "ID!" and insert --IDI-- therefor In the Claims In Column 13, Line 65, in Claim 2, after "node,", delete "if"

In Column 14, Line 53, in Claim 10, delete "IDs," and insert --IDs;-- therefor

In Column 15, Line 1, in Claim 11, delete "10" and insert --9-- therefor

In Column 15, Line 11, in Claim 11, after "the", delete "campaign"

In Column 15, Line 12, in Claim 11, after "node,", delete "if"

In Column 16, Line 35, in Claim 18, delete "IDs," and insert --IDs;-- therefor